United States Patent [19]

Morkoski et al.

[11] 3,847,441
[45] Nov. 12, 1974

[54] POWER ADJUSTABLE TRACTOR WHEELS

[75] Inventors: James Morkoski, Memphis, Tenn.;
Louis B. Garriott, Jr., Munster, Ind.

[73] Assignee: International Harvester Company, Chicago, Ill.

[22] Filed: Mar. 4, 1974

[21] Appl. No.: 448,104

[52] U.S. Cl. .......................... 301/9 TV, 301/36 R
[51] Int. Cl. ........................................... B60b 23/12
[58] Field of Search ................ 301/9 TV, 36 R, 1; 180/DIG. 2

[56] References Cited
UNITED STATES PATENTS

| | | | |
|---|---|---|---|
| 2,467,482 | 4/1949 | Hutchings | 301/9 TV |
| 2,682,430 | 6/1954 | Brubaker | 301/9 TV |
| 2,755,138 | 7/1956 | Brink | 301/9 TV |
| 2,840,418 | 6/1958 | Findley | 301/9 TV |
| 3,347,598 | 10/1967 | Carlstrom | 301/9 TV |

FOREIGN PATENTS OR APPLICATIONS

| | | | |
|---|---|---|---|
| 811,786 | 6/1951 | Germany | 301/9 TV |
| 755,301 | 8/1956 | Great Britain | 301/9 TV |
| 926,176 | 9/1954 | Germany | 301/9 TV |

*Primary Examiner*—M. Henson Wood, Jr.
*Assistant Examiner*—Reinhard J. Eisenzopf
*Attorney, Agent, or Firm*—Ronald C. Kamp; Floyd B. Harman

[57] ABSTRACT

An adjustable tread wheel assembly for a tractor axle wherein a relatively long cylindrical member or drum is secured to the axle and has an external continuous helical track on its periphery cooperative with an internal continuous helical rail on the wheel rim over its entire circumference to provide even weight distribution, means exerting axial and radial forces being provided for frictionally clamping the rail to the track and additional means being provided for integrally securing the rim to the mounting member. Means are also provided for converting a single wheel to a dual wheel assembly.

6 Claims, 10 Drawing Figures

PATENTED NOV 12 1974

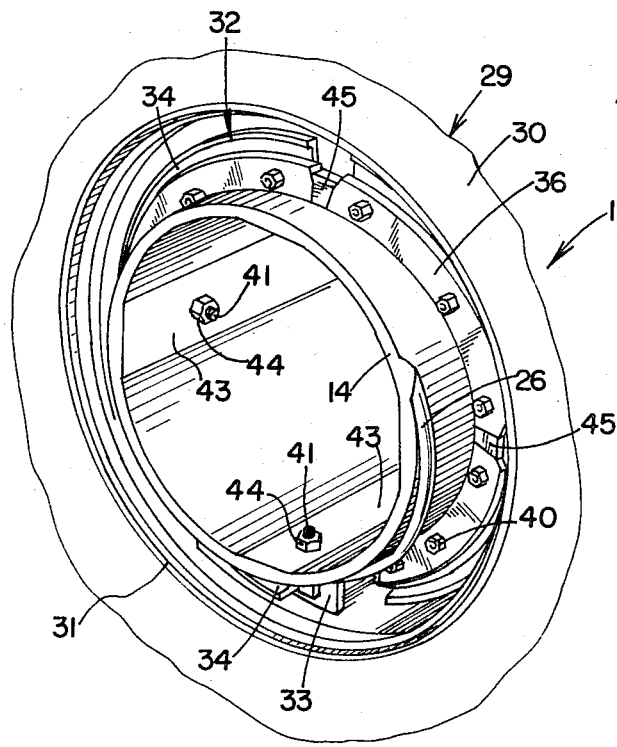
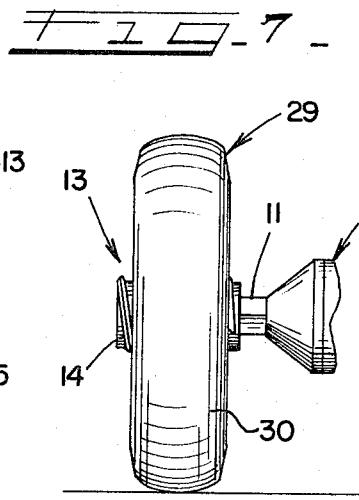
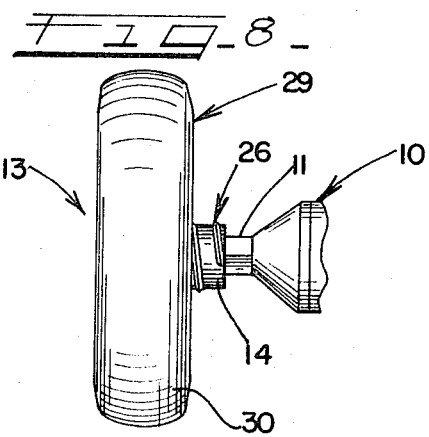
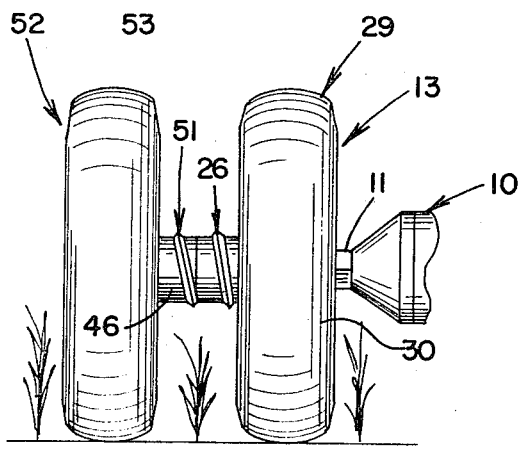
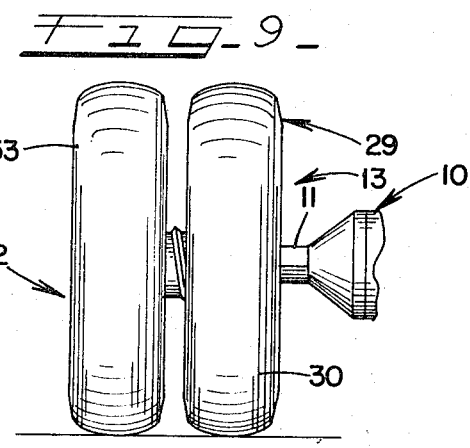

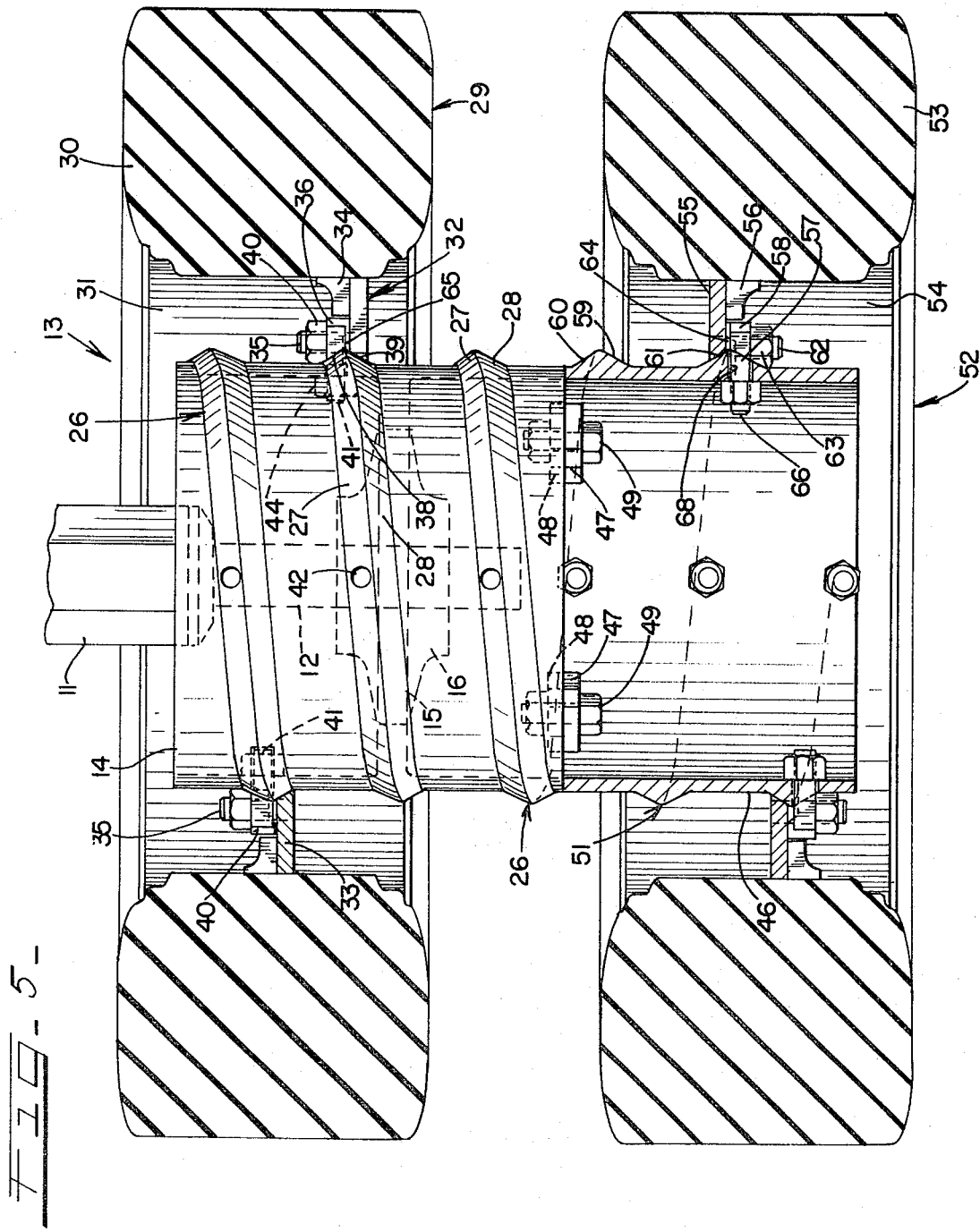

POWER ADJUSTABLE TRACTOR WHEELS

BACKGROUND OF THE INVENTION

This invention relates to adjustable tread wheels for vehicles and particularly for agricultural tractors.

Due to the varying demands of agricultural operations it is necessary that the drive wheels of a tractor be axially adjustable to different tread widths as needed in plowing, cultivating, disking, etc. It is also frequently desirable to adjust the tread in the field, and in view of the increasing size and weight of wheeled tractors the importance of taking advantage of the tractor's own power in making the necessary adjustments is obvious.

Among disadvantages of prior adjustable tread wheel devices has been their expense and complexity, the expenditure of considerable time and labor being required in making the adjustments. Another disadvantage has been the weakness of the mounting mechanisms rendering them subject to disablement and frequent repairs. An important object of the present invention, therefore, is the provision of improved means for adjustably mounting drive wheels on a vehicle axle for tread adjustment.

Another object of the invention is the provision of novel means for mounting a wheel on the driven axle of a tractor whereby overall contact is made between the wheel rim and the mounting means to assure adequate load carrying capcity therefor.

Another object of the invention is the provision os improved mounting means for variable tread tractor wheels wherein novel locking means are utilized to secure the wheel rim to the axle.

A further object of the invention is the provision, in variable tread tractor wheels of novel means accommodating the mounting of dual wheels on the tractor drive axle to furnish more floatation where required by soil conditions.

DESCRIPTION OF THE DRAWINGS

FIG. 4 is a perspective view similar to FIG. 3 showing the tire and rim on the mounting drum detached from the tractor drive axle;

FIG. 5 is an enlarged sectional view of the optional dual wheel assembly of FIG. 1;

FIG. 7 is a view showing the position of one of the primary single wheel assemblies disposed for relatively narrow tread spacing;

FIG. 8 is a view similar to FIG. 7 showing the wheel adjusted outwardly for wider tread spacing;

FIG. 9 shows the dual wheel arrangement wherein the two wheels at one side of the tractor are closely spaced; and FIG. 10 is a view similar to FIG. 9 illustrating another adjustment of the wheels of the dual wheel assembly wherein the spacing is such that the wheels travel between adjacent crop rows.

DESCRIPTION OF THE PREFERRED EMBODIMENT

One of the adjustable tread rear drive wheels of a conventional farm tractor is shown in FIGS. 7 and 8, FIGS. 9 and 10 illustrating the application of dual wheels to the mounting apparatus of this invention. A differential housing is indicated at 10 having extending from one side thereof an axle housing 11 in which is rotatably mounted an axle 12, shown in FIGS. 1, 2 and 5, it being understood that a similar housing and axle extend laterally from the other side of the differential.

Figure 2:
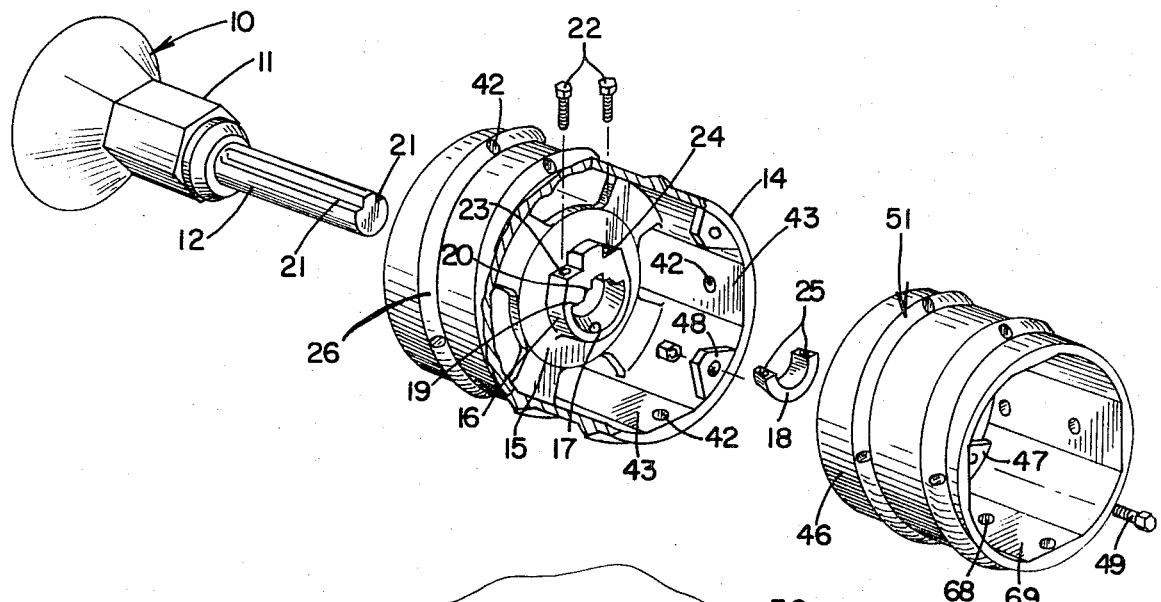
FIG. 2 is an exploded view in perspective, with parts broken away, of a portion of the primary single wheel mounting means of this invention with an extension or adaptor drum element for use in converting a single wheel to a dual wheel arrangement.
Figure 3:
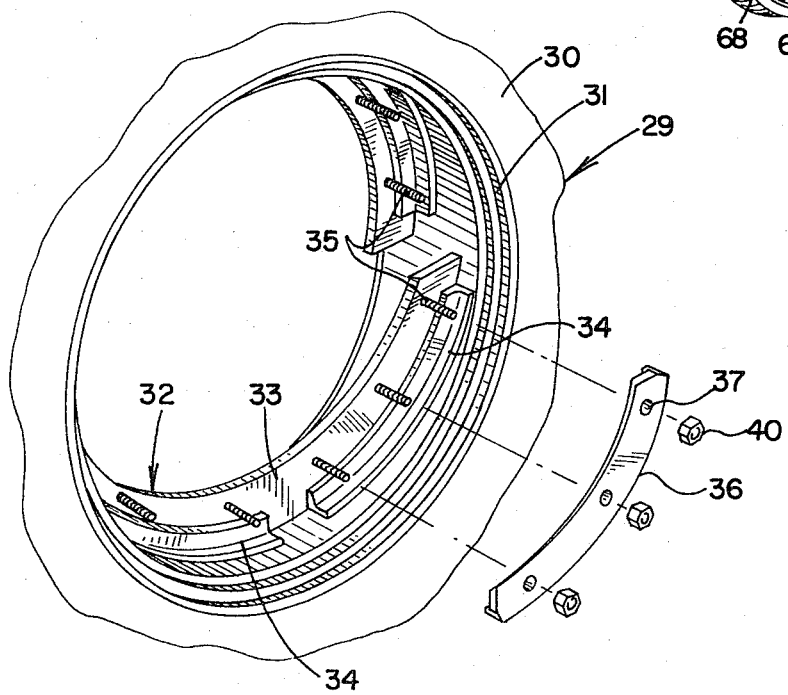
FIG. 3 is an enlarged exploded detail in perspective of the primary tire and rim assembly detached from the axle mounting means.

The primary single adjustable wheel assembly of this invention is indicated in FIGS. 4 and 5 by the numeral 13 and comprises a cylindrical mounting member in the form of an elongated drum 14 to the interior of which is affixed a spider 15 having a hub member 16 provided with a contoured axial bore, shown clearly in FIG. 2 having a semicylindrical lower portion 17 adapted to seat a semicircular removable hub element 18, mating with the lower semicircular portion of axle 12.

Interior shoulders 19 on hub member 16 are engageable with the ends of removable hub element 18, and additional shoulders 20 are seated in recesses 21 formed in the upper portion of axle 12 to provide for non-rotational sliding reception of drum 14 on axle 12. Axial displacement is prevented by the provision of screws 22 receivable in openings 23 extending from exterior shoulders 24 on hub member 16 and into threaded openings 25 in the ends of element 18 to securely clamp the drum to the axle.

To the periphery of the cylindrical mounting drum 14 is affixed helical track means 26 having its ends terminating proximate the ends of the drum. As clearly indicated in FIG. 5, track 26 is triangular in section with its apex projecting radially outwardly and forming sides 27 and 28.

The single tire and rim unit for mounting on drum 14 is indicated at 29 and includes a tire 30 and a rim member 31, the latter having a smaller axial length than that of mounting cylinder or drum 14. The tire-carrying rim member is disposed concentrically with cylindrical member 14 and to its inner surface is affixed complementary helical rail means cooperable with track 26 to provide a screw thread adjustment by which rotation of the drum 14 relative to rim 31 simultaneously axially adjusts the tire-carrying rim axially.

The complementary helical rail means on the interior of the wheel rim is designated in its entirety by the numeral 32 and includes a continuous helical rail member 33 projecting radially inwardly toward the periphery of the mounting drum. A plurality of circumferentially spaced arcuate and helically arranged seqments in the form of angle bars 34 are affixed to the continuous rail member 33 and are in turn affixed to the interior surface of the wheel rim.

Rail member 33 carries axially extending circumferentially spaced bolts 35 for attaching thereto a plurality of helically arranged members 36 forming an intermittent helical rail part having openings 37 therein to receive bolts 35. Rail parts 36 are disposed parallel to and are slightly longer than the respective angle bars 34 and serve a clamping and force exerting function that will become clear from a consideration of FIG. 5, wherein it is shown that rail element 36 has a beveled or inclined edge 38 engageable in camming relation with side 27 of track 26 on drum 14. Continuous rail member 33 also has a beveled edge 39 mating with side 28 of track 26. Nuts 40 on the threaded bolts 35 are provided for clamping the rail elements 36 to continuous rail member 33. Sufficient clearance is provided between rail elements 33 and 36 in assembly 13 to allow these elements to ride up the external helix 26 when nuts 40 are tightened.

In adjusting the wheels on opposite sides of the tractor outwardly or inwardly to change the tread width while the tires engage the ground, the nuts 40 on one wheel assembly are loosened and the tractor axle revolved by tractor power in the required direction with rail means 32 traveling on track means 26 until it reaches a position which has been selected by means hereinafter set forth, whereupon nuts 40 are tightened, bringing the rail member 36 closer to fixed rail member 33.

As members 36 and 33 cam up the respective sides 27 and 28 of track 26 the force of the clamping action of nuts 40 exerted axially also reacts against the fixed rail member 33 to direct a force radially to effectively increase the distance between rim and drum and frictionally secures the rim on the drum.

Additional means is provided to transmit the torque of axle 12 to the wheel assembly in the form of a plurality of bolts 41, each of which is insertable in openings 42 provided in face 27 of helix 26 and extending into thickened and interiorly flattened sections 43 of the drum for the reception of fastening nuts 44. The bolt head 45 is wedge shaped for reception between the inclined ends of adjacent clamping and rail elements 36, and are wedged tightly therein upon tightening nuts 44, the interior of the drum being readily accessible to the tractor operator for this purpose.

It will be noted that complete contact is made between the continuous track means 26 and continuous rail means 33 throughout the helical length thereof, providing adequate load carrying capacity for the wheels. It may also be noted that the tread width is adjustable by utilizing the power of the tractor for rotating the axle 12 and mounting drum 14, and by utilizing its frictional engagement with the ground to immobilize the tire and rim unit 29.

When it is desired to change the wheel tread the tractor operator removes bolts 41 from one unit, reinserting one of the bolts at the desired location on the track 26 to act as a stop. He then loosens nuts 40 and drives the tractor, for example, forwardly until the rail engages the stop. He then removes the stop bolt and reinserts all bolts 41, tightening clamping nuts 40 and then tightening nuts 44 on bolts 41. Since the helical tracks and rails for the wheel assemblies on both sides of the tractor are right handed, the operator must follow the same procedure as above for the other wheel assembly, driving the tractor backwards to shift the other wheel in the direction desired.

The optional dual wheel arrangement shown in FIGS. 1, 5, 9 and 10 is accomplished by the provision of an extension or adaptor drum member 46 having a plurality of circumferentially spaced lugs 47 affixed to the interior thereof at its inner end and adapted to abut mating lugs 48 affixed to the interior of drum 14 adjacent the outer end thereof, registering openings being provided in lugs 47 and 48 for the reception of fastening bolts 49.

The inner end of a helical track 51 on extension 46 meets the outer end of and forms a continuation of track 26 on drum 14. The second or outer wheel assembly 52 of the dual wheel arrangement illustrated is a substantial duplicate of inner wheel assembly 13, and the wheels can be adjusted simultaneously or independently to achieve the close spacing indicated in FIG. 9 or the wide spacing indicated in FIG. 1 wherein sufficient clearance is provided between the wheels to straddle a crop row.

Outer wheel assembly 52 includes a tire 53 mounted on a rim 54 having a continuous internal helical rail member 55. Angles 56, corresponding to angles 34 of the wheel assembly 13 are affixed to the outer face of rail 55 and the beveled edges 57 of intermittent helical rail elements 58 engage the outer face 59 of track 51, the inner face 60 of the track being engaged by the beveled edge 61 of rail member 55, rail element 58 being clamped to rail 55 by outwardly directed bolts 62 and secured in the same manner as rail elements 36 for inner wheel assembly 13, by the provision of nuts 63. A recess 64 indicated in FIG. 5, provides the necessary clearance to permit rail elements 55 and 58 of the internal helix to ride up the outwardly converging cam faces of external helix 51 when nuts 63 are tightened, a similar recess 65 in wheel assembly 13 serving the same purpose for rail elements 33 and 36.

Figure 1:
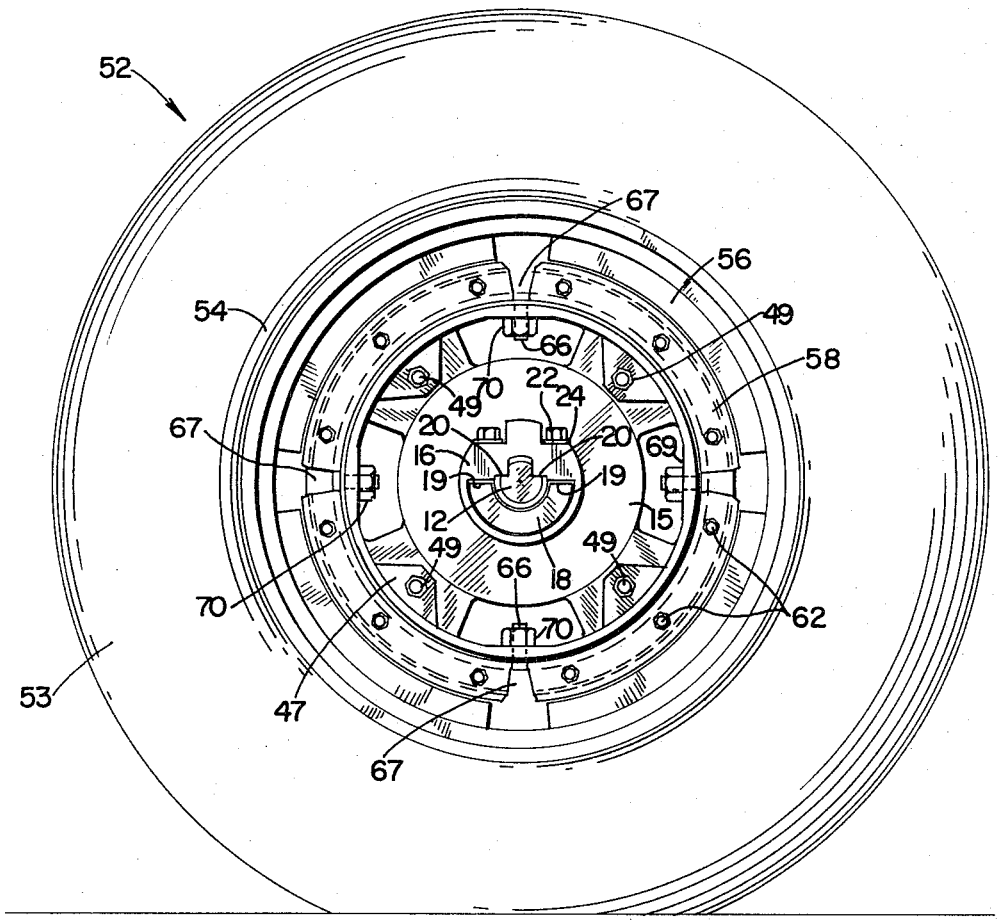
FIG. 1 is a view in side elevation of an adjustable tread dual tractor drive wheel assembly incorporating the features of this invention showing only the outer wheel.
Figure 6:
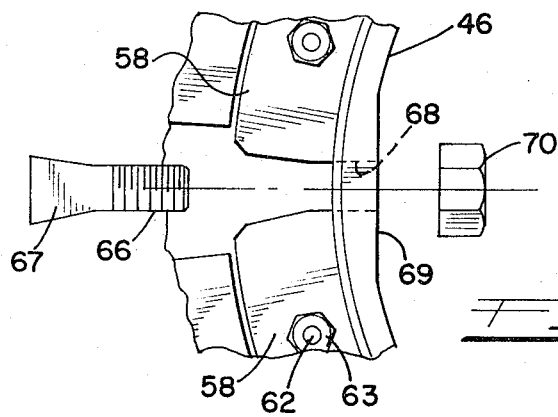
FIG. 6 is an enlarged detail of a portion of the structure shown in FIG. 1.

Wedge bolts 66 having tapered heads 67 receivable between adjacent ends of rail elements 58 are also provided as in wheel assembly 13 for reception in openings 68 in track 51 and penetrating the interior of the drum 46 through flattened sections 69 shown in FIGS. 1 and 2, and secured by nuts 70.

The dual wheel assemblies 13 and 52 may be power adjusted in the manner previously described for the single wheel assembly, or the wheels can be independently adjusted to achieve the positions of FIGS. 9 and 10. For example, if the operator desires to change the wheels from the position of FIG. 9 to that of FIG. 10, he can drive the inner wheel assembly on a supporting block and adjust the outer wheel assembly relative thereto.

It is believed that the construction and operation of the novel adjustable wheel tread apparatus of this invention will be clearly understood from the foregoing description. It should also be understood that economical and efficient adjustable wheel mounting means have been provided which can be easily and quickly operated under field conditions by a single operator.

What is claimed is:

1. An axially adjustable wheel assembly for a vehicle having a driven axle comprising: a tire-carrying rim member, a cylindrical mounting member concentric with said rim member having an external diameter less than the internal diameter of said rim member and an axial length at least as great as that of said rim member and secured to the driven axle for rotation therewith, helically arranged track means on the periphery of said mounting member, complementary helically arranged rail means on said rim member cooperatively engageable with the helical track means on said mounting member to accommodate rotation and simultaneous axial adjustment of said rim member relative to said mounting member, and means for securing the rim member to the mounting member at selected adjusted positions movable in an axial direction and reacting against one of said members to exert a force radially against the other of said members to effectively increase the distance between said members and frictionally lock them together.

2. The invention set forth in claim 1, wherein said means for securing the rim member to the mounting member includes helically arranged clamping means parallel to and connectable to said rail means and cooperatively engageable with said track means, upon tightening said clamping means, to frictionally secure said rim member to said mounting member.

3. The invention set forth in claim 2, wherein said securing means also includes bolt means carried by said rail means, said mounting member having openings therein to receive said bolt means.

4. The invention set forth in claim 3, wherein said clamping means is discontinuous and comprises at least two spaced clamping elements, the space between adjacent ends of said elements being wedge shaped, and said bolt having a threaded shank for reception in the opening in said mounting member and a wedge shaped head for reception in the space between said elements, a nut being mounted on said threaded shank for tightening the wedge shaped bolt head in said space.

5. The invention set forth in claim 2, wherein said helical track means is triangular in section and said rail means has a mating taper to cam against one face of said track means and said clamping element is tapered for camming engagement with the other face of said track means.

6. An axially adjustable wheel assembly for a dual wheeled vehicle having a driven axle comprising, a plurality of tire-carrying rim members, a mounting drum member concentric with said rim member having an external diameter less than the internal diameter of said rim member and an axial length at least as great as that of said rim member and secured to the driven axle for rotation therewith, a helically arranged track means on the periphery of said mounting drum member, an adaptor drum member concentric with said rim member having an external diameter less than the internal diameter of said rim member and an axial length at least as great as that of said rim member and in axial alignment with said mounting drum member, a means for releasably securing the outward end of said mount drum member and the inward end of said mount drum member and the inward end of said adaptor drum member, helically arranged external track means on the periphery of said adaptor drum member and forming a continuation of said tract means on said mounting drum member, complementary helically arranged rail means on said rim member cooperatively engageable with said helical track means on said adaptor drum member or said mounting drum member to accommodate rotation and simultaneous axial adjustment of said rim member relative to said mounting drum member and said adaptor drum member, and a means for securing said rim member to one of said mounting drum member and said positions movable in an axial direction and reacting against one of said members to exert a force radially against one of the other of said members to effectively increase the distance between said members and frictionally lock them together.

* * * * *